US009048507B2

(12) United States Patent
Eitouni et al.

(10) Patent No.: US 9,048,507 B2
(45) Date of Patent: Jun. 2, 2015

(54) HIGH IONIC CONDUCTIVITY ELECTROLYTES FROM POLY(SILOXANES-CO-ETHYLENE OXIDE)

(75) Inventors: Hany Basam Eitouni, Oakland, CA (US); Bing R. Hsieh, Pleasanton, CA (US)

(73) Assignee: Seeo, Inc., Hayward, CA (US)

(*) Notice: Subject to any disclaimer, the term of this patent is extended or adjusted under 35 U.S.C. 154(b) by 51 days.

(21) Appl. No.: 13/255,092

(22) PCT Filed: Feb. 26, 2010

(86) PCT No.: PCT/US2010/025680
§ 371 (c)(1),
(2), (4) Date: Sep. 6, 2011

(87) PCT Pub. No.: WO2010/101791
PCT Pub. Date: Sep. 10, 2010

(65) Prior Publication Data
US 2011/0318649 A1 Dec. 29, 2011

Related U.S. Application Data

(60) Provisional application No. 61/158,257, filed on Mar. 6, 2009.

(51) Int. Cl.
*C08G 77/24* (2006.01)
*H01M 10/0565* (2010.01)
*C08G 65/336* (2006.01)
*C08G 77/46* (2006.01)
*C08J 5/20* (2006.01)
*H01B 1/12* (2006.01)
*H01M 10/052* (2010.01)
*C08G 77/26* (2006.01)
*C08G 77/14* (2006.01)
*C08G 77/12* (2006.01)
*C08K 5/5419* (2006.01)

(52) U.S. Cl.
CPC ............ *H01M 10/0565* (2013.01); *C08G 77/24* (2013.01); *C08G 77/26* (2013.01); *C08G 77/14* (2013.01); *C08G 65/336* (2013.01); *C08G 77/12* (2013.01); *C08G 77/46* (2013.01); *C08J 5/20* (2013.01); *C08J 2383/12* (2013.01); *C08K 5/5419* (2013.01); *H01B 1/122* (2013.01); *H01M 10/052* (2013.01); *H01M 2300/0082* (2013.01); *Y02E 60/122* (2013.01)

(58) Field of Classification Search
CPC ........ C08G 77/24; C08G 77/26; C08G 77/46; C08G 77/14; C08G 77/12; C08G 65/336; H01B 1/122; H01M 10/052; H01M 10/0565; H01M 2300/0082
USPC ............... 528/15, 31, 29, 26, 28, 42
See application file for complete search history.

(56) References Cited

U.S. PATENT DOCUMENTS

| 5,112,512 | A | * | 5/1992 | Nakamura | 252/62.2 |
| 5,138,009 | A | * | 8/1992 | Inoue | 528/15 |
| 5,144,054 | A | | 9/1992 | Shioya | |
| 5,196,484 | A | | 3/1993 | Giles | |
| 5,407,593 | A | | 4/1995 | Whang | |
| 5,755,985 | A | | 5/1998 | Vallee | |
| 6,682,823 | B2 | | 1/2004 | Okada | |
| 7,026,071 | B2 | | 4/2006 | Mayes | |
| 7,101,643 | B2 | | 9/2006 | Kerr | |
| 2003/0180625 | A1 | | 9/2003 | Oh | |
| 2004/0069973 | A1 | * | 4/2004 | Keohan et al. | 252/500 |
| 2005/0019659 | A1 | | 1/2005 | Shiozaki | |
| 2005/0271948 | A1 | | 12/2005 | Kang | |
| 2006/0035154 | A1 | | 2/2006 | West | |
| 2006/0068296 | A1 | | 3/2006 | Nakagawa | |
| 2008/0206647 | A1 | | 8/2008 | Katsuyama | |

OTHER PUBLICATIONS

C.V. Nicholas, D.J. Wilson, C. Booth and J.R.M. Giles. Br. Polym. J. 20 (1988), p. 289.
O. Buriez, Y. Han, J. Hou, J. Kerr, J. Qiao, S. Sloop, M. Tian, S. Wang, J. Power Sources 89 (2000) 149.
S. Pantaloni, S. Passerini, F. Croce, B. Scrosati, A. Roggero and, M. Andrei, Electrochim. Acta 34 (1989) 635.
Nagaoka et al., "High Ionic Conductivity in Poly(Dimethyl Siloxane-co-Ethylene Oxide) Dissolving Lithium Perchlorate," Journal of Polymer Science: Polymer Letters Edition, 22(12): 659-663, Dec. 1984.
H. Allcock, S. O'Connor, D. Olmeijer, M. Napierala, and C. Cameron, Macromolecules 29 (1996) 7544.
R. Hooper, L. Lyons, D. Moline, and R. West, Organometalics 18 (1999) 3249.
Zhang, "Network-Type Ionic Conductors Based on Oligoethyleneoxy-Functionalized Pentamethylcyclopentasiloxanes", Macromolecules 2005, 38, 5714-5720.
Li et al., "Ionic Conductivity of Methylsiloxane terminated Polyethylene Oxide with Lithium Perchlorate Network Films," Chinese Journal of Polymer Science, vol. 6, No. 4, 1988 (1988), p. 332-333.
Kohjiya et al., "Preparation of Copolymeric Gels Composed of Polydimethylsiloxane and Polyethylene Oxide Network Chains and Their Specific Characteristics," Bulletin of the Chemical Society of Japan, 71(4): 961-971, Apr. 1998, p. 962.

(Continued)

*Primary Examiner* — Margaret Moore
(74) *Attorney, Agent, or Firm* — R'Sue Popowich Caron

(57) ABSTRACT

Polymer electrolytes offer increased safety and stability as compared to liquid electrolytes, yet there are a number of new challenges that polymer electrolytes introduce. A novel polymer electrolyte, as disclosed herein, is an ionically-conductive polymer with a backbone that is both highly flexible and highly conductive with high conductivity pendant chains attached, thus increasing the concentration of lithium coordination sites and improving ionic conductivity. Previous strategies for comb-type conductive polymers have focused on attaching either conductive pendant chains to a flexible non-conductive backbone or conductive pendant groups to a marginally flexible conductive backbone.

9 Claims, No Drawings

(56) References Cited

OTHER PUBLICATIONS

K Nagaka, H Naruse, I Shinohara, M Watanabe, J. Poly. Sci. 22 (1984) 659.

Z. Zhang, et al, "Network-Type Ionic Conductors Based on Oligoethyleneoxy-Functionalized Pentamethylcyclopentasiloxanes," Macromolecules 2005, 38, 5714-5720.

* cited by examiner

HIGH IONIC CONDUCTIVITY ELECTROLYTES FROM POLY(SILOXANES-CO-ETHYLENE OXIDE)

CROSS-REFERENCE TO RELATED APPLICATIONS

This application claims priority to International Patent Application PCT/US10/25680, filed Feb. 26, 2010 and to U.S. Patent Provisional Application 61/158,257, filed Mar. 6, 2009, both of which are incorporated by reference herein. This application is also related to International Patent Application PCT/US10/25690, filed Feb. 26, 2010 and to U.S. Patent Provisional Application 61/158,241, filed Mar. 6, 2009, both of which are incorporated by reference herein.

BACKGROUND OF THE INVENTION

Field of the Invention

This invention relates generally to electrolytes for electrochemical cells, and, more specifically, to polymer electrolytes for lithium batteries.

Polymer electrolytes offer increased safety and stability as compared to liquid electrolytes, yet there are a number of new challenges that polymer electrolytes introduce. The primary limitation is in the ionic conductivity. Polymer chains in the electrolytes solvate ions and provide ion conduction through segmental motion. Thus considerable effort has been devoted to increasing the segmental motion of these solvating polymer chains.

The most common polymer studied for use as an electrolyte is polyethylene oxide (PEO). Although PEO has good conductivity at high temperatures, its conductivity at low temperatures is extremely poor. Three common strategies have been employed with PEO-type polymers for increasing conductivity.

The first strategy is to prevent PEO from crystallizing. This can be done by altering the structure of the polymer to prevent formation of crystalline structures. One way to do this is by introducing heterogenous groups into the PEO chain. Examples of such groups include oxymethylene and propylene oxide groups.

The second method for improving conductivity is to incorporate side or pendant PEO chains that are attached to a polymer backbone. The pendant chains have increased flexibility compared to the original linear PEO backbone, which leads to increased segmental motion and ionic conductivity. Poly(oxyethylene methacrylates) and polyvinylethers are examples of useful pendant-containing polymer electrolytes.

The third common strategy for improving conductivity is to increase the flexibility and segmental motion of a polymer where pendant groups are not present. An example of such a linear system is poly(dimethyl siloxane-co-ethylene oxide) in which the siloxane units increase flexibility while the ethylene oxide units provide coordinating sites for lithium salts.

In all of the approaches used to improve polymer conductivity described above, the polymers are limited in the concentration of lithium ion coordination sites because of backbone segments that are present only for structural reasons or because of potential ion coordination sites that are taken up with bonding to side chains instead. It would be useful to have a polymer with an increased concentration of lithium coordination sites and improved ionic conductivity.

DETAILED DESCRIPTION

The embodiments of the invention are illustrated in the context of electrolytes in a lithium battery. The skilled artisan will readily appreciate, however, that the materials disclosed herein will have application in a number of other contexts where ionic conduction is desirable, particularly where low volatility is important.

Previous strategies for comb-type conductive polymers have focused on either attaching conductive pendant chains to a flexible non-conductive backbone or attaching conductive pendant groups to a marginally flexible conductive backbone. In the embodiments of the invention, as disclosed herein, conductive pendant chains are attached to a backbone that is both flexible and conductive.

Due to high power demands typical for lithium batteries, there is a strong need for polymer electrolyte materials with high ionic conductivity at room temperature. The polymers described herein overcome many of the problems that plague previously-reported polymer electrolytes. Known polymer electrolyte materials with high room temperature ionic conductivity include polysiloxanes and polyphosphazenes having oligomeric ethylene oxide pendant groups. The remarkable room temperature conductivities for these polymers have been ascribed to highly flexible inorganic backbones that produce an amorphous polymer matrix with a very low glass transition temperature ($T_g$). The backbone however does not coordinate lithium ions itself and thus reduces the total concentration of possible coordination sites. The structure of a polysiloxane with grafted oligomeric ethylene oxide pendant groups is shown as (1) below.

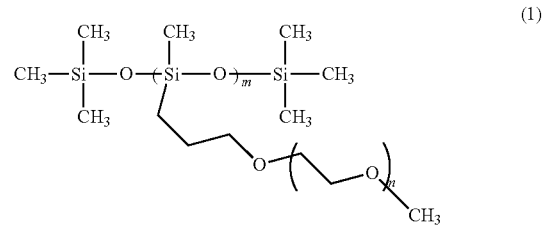

(1)

In one embodiment of the invention, the polymer structure shown as (2) below can be used as an electrolyte. The silicon-containing groups are interspersed alternately between oligomeric PEO, but within the alternating sites, the silicon-containing groups are random (e.g., $S_a$—PEO—$S_b$—PEO—$S_c$—PEO—$S_d$—PEO—$S_e$PEO—$S_f$). There can be any of a variety of R groups associated with each silicon-containing group. In one arrangement, the R groups are one or more of highly polar groups, cyclic carbonates, nitrile groups, N-pyrrolidone groups, and perfluoroalkyl groups. The polymer (2) has a lower $T_g$ than PEO and coordinates lithium ions better than the pure siloxane backbone shown above. Additionally, the polymer shown in (2) is hydrolytically stable compared to linear poly(dimethyl siloxane-co-ethylene oxide), which contains weak Si—O—C bonds. The R groups in (2) represent variations of oligomeric ethylene oxide pendant groups or other coordinating groups such as highly polar groups, cyclic carbonate, nitrile groups, N-pyrrolidone groups, and perfluoroalkyl groups.

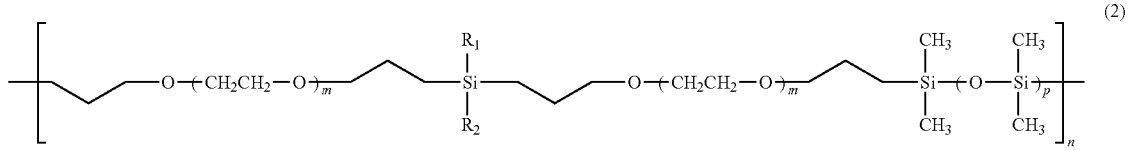

(2)

In one embodiment, the range of integer m is approximately 1 to 10. In one embodiment, the range of integer n is approximately 10 to 10000, and the range of integer p is approximately 1 to 10. In one embodiment, $R_1$ and $R_2$ groups can be selected from, but are not limited to, the following groups:

—$CH_3$
—$(CH_2)_3O$—$(CH_2CH_2O)_o$—$CH_3$
—$(CH_2)_2Si(CH_3)_2OSi(CH_3)_2$—$(CH_2)_3O$—$(CH_2CH_2O)_o$—$CH_3$
—$(CH_2)_2Si(CH_3)_2$—$(CH_2)_3O(CH_2CH_2O)_o$—$CH_3$
$(CH_2)_2Si(CH_3)_2$—O—$(CH_2CH_2O)_o$—$CH_3$ wherein o is an integer ranging from approximately 1 to 20

In one exemplary embodiment of the invention, the novel polymer (2) is made via a hydrosilylation condensation polymerization as shown in the following scheme:

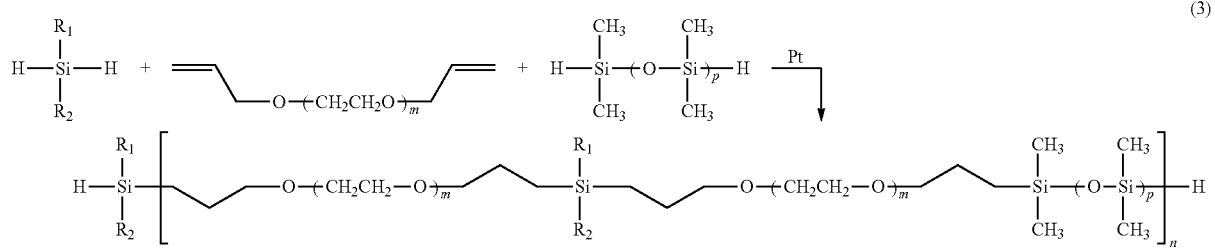

(3)

In one embodiment of the invention, the polymer material (2) described above is combined with an electrolyte salt and is used as the electrolyte between an anode and a cathode in an electrochemical device such as battery cell. In some arrangements, the electrolyte can also be used in the anode and/or in the cathode. Some examples of useful electrolyte salts include $AgSO_3CF_3$, NaSCN, $NaSO_3CF_3$, KTFSI, NaTFSI, $Ba(TFSI)_2$, $Pb(TFSI)_2$, $Ca(TFSI)_2$, and mixtures thereof. In some arrangements, the electrolyte salt contains lithium. Some examples of useful lithium electrolyte salts include LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$), lithium alkyl fluorophosphates, lithium oxalatoborate, as well as other lithium bis(chelato)borates having five to seven membered rings, $LiPF_3(C_2F_5)_3$, $LiPF_3(CF_3)_3$, LiB$(C_2O_4)_2$, and mixtures thereof.

In another embodiment of the invention, a plurality of battery cells that use the polymer electrolyte described herein can be joined together to form a battery pack.

EXAMPLE

The following example provides details relating to fabrication of novel polymer electrolyte (3) in accordance with embodiments of the present invention. It should be understood the following is representative only, and that the invention is not limited by the detail set forth in the example.

A three-neck round flask was equipped with a magnetic stirrer, two addition funnels, a nitrogen inlet, and a rubber septum. Sodium hydride (60% dispersion in mineral oil) (46 g, 1.15 mol) and then inhibitor-free tetrahydrofuran (500 ml) were added into the flask. Triethylene glycol monomethyl ether (156 ml, 0.976 mol) and allyl bromide (100 ml, 1.155 mol) were placed separately into each of the two addition funnels to await addition into the flask. The mixture was cooled with an ice-water bath, and then the triethylene glycol monomethyl ether was added dropwise from the funnel into the flask. The resulting mixture was stirred at room temperature for at least two hours. The mixture was cooled again with an ice-water bath before the allyl bromide was added drop-wise from the funnel into the flask. The resulting mixture was stirred overnight at room temperature. The solid (mostly NaBr) that had formed in the mixture was removed by suction filtration. The solid was rinsed with tetrahydrofuran. The filtrate was concentrated in vacuo (rotavap followed by pump under vacuum) and then vacuum distilled (80-90° C.) to give triethylene glycol allyl methyl ether (4) as a colorless liquid.

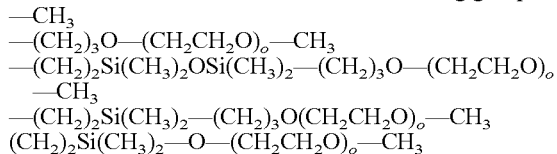

(4)

A flask was equipped with a magnetic stirrer and an addition funnel. Dichloro-methylsilane (400 ml, 3.84 mol) and toluene (300 ml) were added into the flask. Triethylene glycol allyl methyl ether (1) (81.6 g, 0.4 mol), toluene (100 ml), and platinum divinyltetramethyldisilane catalyst (2.1-2.4% platinum concentration) (0.25 ml) were placed in the addition funnel to await addition into the flask. The disiloxane solution was heated to 40° C., before adding the triethylene glycol allyl methyl ether solution dropwise. The resulting solution was heated to 50° C. for a total of 24 hours, cooled, and then concentrated in vacuo (rotavap followed by pump under vacuum). Under a nitrogen atmosphere, anhydrous tetrahydrofuran (300 ml) was added to the flask and the solution was cooled to 0° C. Lithium aluminum hydride solution (2 M in THF) was added dropwise and allowed to warm to room temperature. The solution was stirred for 8 hours. The solution was concentrated in vacuo (rotovap followed by pump under vacuum). The product (5) was then abstracted in toluene (200 ml).

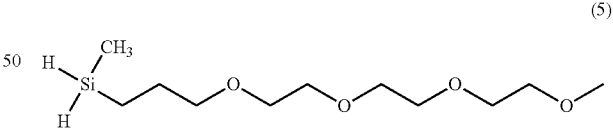

(5)

A three-neck round flask was equipped with a magnetic stirrer, two addition funnels, a nitrogen inlet, and a rubber septum. Sodium hydride (60% dispersion in mineral oil) (46 g, 1:15 mol) and then inhibitor-free tetrahydrofuran (500 ml) were added into the flask. Tetraethylene glycol (169 ml, 0.976 mol) and allyl bromide (100 ml, 1.155 mol) were placed separately into each of the two addition funnels to await addition into the flask. The mixture was cooled with an ice-water bath, and then the tetraethylene glycol was added dropwise from the funnel into the flask. The resulting mixture was stirred at room temperature for at least two hours. The mixture was cooled again with an ice-water bath before the allyl bromide was added dropwise from the funnel into the flask. The resulting mixture was stirred overnight at room temperature. The solid (mostly NaBr) that had formed in the mixture was removed by suction filtration. The solid was rinsed with tetrahydrofuran. The filtrate (6) was concentrated in vacuo (rotavap followed by pump under vacuum).

(6)

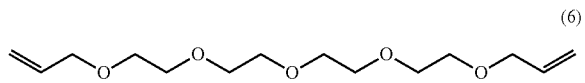 [SMILES: C=CCOCCOCCOCCOCCOCC=C]

A flask was equipped with a magnetic stirrer and an addition funnel. 1,1,3,3-tetramethydisiloxane (40 g, 0.3 mol), 2HSiPEG (2) (75 g, 0.3 mol), and toluene (300 ml) were added into the flask. Tetraethylene glycol diallyl ether (3) (165 g, 0.6 mol), toluene (100 ml), and platinum divinyltetramethyldisilane catalyst (2.1-2.4% platinum concentration) (0.25 ml) were placed in the addition funnel to await addition into the flask. The disiloxane solution was heated to 60-70° C., before adding the tetraethylene glycol diallyl ether solution dropwise. The resulting solution was heated for a total of 24 hours, cooled, and then concentrated in vacuo (rotavap). The resulting polymer (7) was precipitated in hexane.

(7)

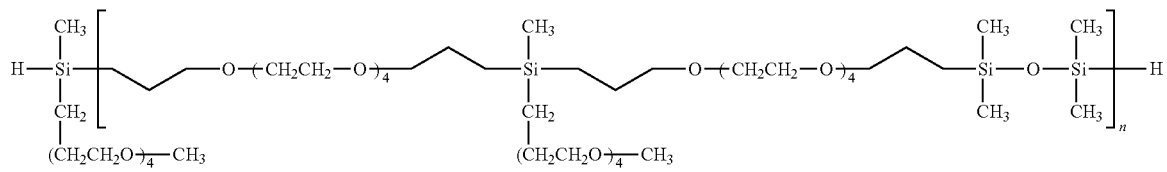

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A polymer, consisting of:
   oligomeric ethylene oxide groups; and
   alternating positions between the oligomeric ethylene oxide groups,
   wherein each alternating position is occupied by either a single silicon-based group or a siloxane-based group, each group selected at random from a plurality of silicon-based groups and siloxane-based groups;
   wherein the silicon-based group has only one silicon atom in its backbone;
   wherein at least some of the silicon-based groups or siloxane based groups have coordinating pendant groups; and
   wherein at least one silicon-based groups and at least one siloxane-based group are included in the polymer.

2. The polymer of claim 1 wherein at least one silicon-based group or one siloxane based group includes at least one coordinating group selected independently from the group consisting of cyclic carbonates, nitrile groups, N-pyrrolidone groups, and perfluoroalkyl groups.

3. The polymer of claim 1 wherein at least one of the silicon-based groups has the following structure:

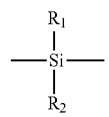

wherein $R_1$ and $R_2$ are each selected independently selected from the group consisting of:
—$CH_3$
—$(CH_2)_3O$—$(CH_2CH_2O)_o$—$CH_3$
—$(CH_2)_2Si(CH_3)_2OSi(CH_3)_2$—$(CH_2)_3O$—$(CH_2CH_2O)_o$—$CH_3$
—$(CH_2)_2Si(CH_3)_2$—$(CH_2)_3O$—$(CH_2CH_2O)_o$—$CH_3$
and
—$(CH_2)_2Si(CH_3)_2$—$O$—$(CH_2CH_2O)_o$—$CH_3$ wherein o is an integer ranging from approximately 1 to 20.

4. The polymer of claim 1 wherein at least one of the siloxane-based groups has the following structure:

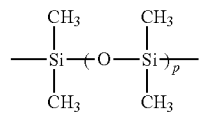

wherein p is an integer in the range of approximately 1 to 10.

5. A polymer consisting of the following structure:

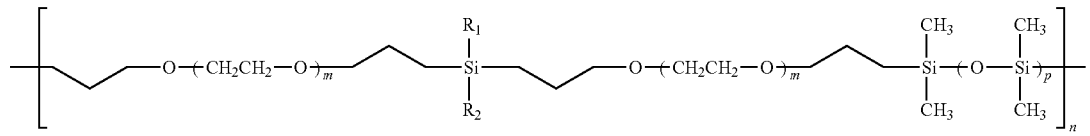

wherein m is an integer ranging from approximately 1 to 10, n is an integer ranging from approximately 10 to 10,000, and p is an integer ranging from approximately 1 to 10; and wherein $R_1$ and $R_2$ are each selected independently from the group consisting of:

—$CH_3$

—$(CH_2)_3O$—$(CH_2CH_2O)_o$—$CH_3$

—$(CH_2)_2Si(CH_3)_2OSi(CH_3)_2$—$(CH_2)_3O$—$(CH_2CH_2O)_o$—$CH_3$

—$(CH_2)_2Si(CH_3)_2$—$(CH_2)_3O$—$(CH_2CH_2O)_o$—$CH_3$ and

—$(CH_2)_2Si(CH_3)_2$—O—$(CH_2CH_2O)_o$—$CH_3$ wherein o is an integer ranging from approximately 1 to 20.

6. An electrochemical device, comprising an electrolyte wherein the electrolyte comprises a polymer according to claim 1 and an electrolyte salt.

7. The device of claim 6 wherein the electrolyte salt is selected from the group consisting of $AgSO_3CF_3$, NaSCN, $NaSO_3CF_3$, KTFSI, NaTFSI, $Ba(TFSI)_2$, $Pb(TFSI)_2$, and $Ca(TFSI)_2$.

8. The device of claim 6 wherein the electrolyte salt comprises lithium.

9. The device of claim 8 wherein the electrolyte salt is selected from the group consisting of LiSCN, $LiN(CN)_2$, $LiClO_4$, $LiBF_4$, Li(Original) $AsF_6$, $LiPF_6$, $LiCF_3SO_3$, $Li(CF_3SO_2)_2N$, $Li(CF_3SO_2)_3C$, $LiN(SO_2C_2F_5)_2)$, lithium alkyl fluorophosphates, lithium oxalatoborate, as well as other lithium bis(chelato)borates having five to seven membered rings, $LiPF_3(C_2F_5)_3$, $LiPF_3(CF_3)_3$, $LiB(C_2O_4)_2$, and mixtures thereof.

* * * * *